United States Patent
Tanahashi

(10) Patent No.: US 7,881,290 B2
(45) Date of Patent: Feb. 1, 2011

(54) SERIAL INTERFACE CIRCUIT AND SERIAL RECEIVER

(75) Inventor: Toshio Tanahashi, Tokyo (JP)

(73) Assignee: NEC Corporation, Tokyo (JP)

( * ) Notice: Subject to any disclaimer, the term of this patent is extended or adjusted under 35 U.S.C. 154(b) by 357 days.

(21) Appl. No.: 12/034,383

(22) Filed: Feb. 20, 2008

(65) Prior Publication Data

US 2008/0205448 A1    Aug. 28, 2008

(30) Foreign Application Priority Data

Feb. 21, 2007  (JP)  ............................... 2007-041169

(51) Int. Cl.
*H04Q 11/00*  (2006.01)
(52) U.S. Cl. .................... 370/366; 370/538; 370/540
(58) Field of Classification Search ......... 370/357–388, 370/537–545, 214
See application file for complete search history.

(56) References Cited

U.S. PATENT DOCUMENTS

| 5,347,270 | A | * | 9/1994 | Matsuda et al. | ............ | 340/2.21 |
| 6,167,077 | A | * | 12/2000 | Ducaroir et al. | ............. | 375/219 |
| 2001/0033568 | A1 | * | 10/2001 | Spooner | ...................... | 370/366 |
| 2002/0191721 | A1 | * | 12/2002 | Tokuhiro | ..................... | 375/354 |
| 2003/0112798 | A1 | * | 6/2003 | Ziegler et al. | ............... | 370/366 |

FOREIGN PATENT DOCUMENTS

| JP | 2-85950 A | 3/1990 |
| JP | 05-081186 A | 4/1993 |
| JP | 7-6130 A | 1/1995 |
| JP | 10-97481 A | 4/1998 |
| JP | 2001-356999 A | 12/2001 |
| JP | 2006-302277 A | 11/2006 |

* cited by examiner

*Primary Examiner*—Ricky Ngo
*Assistant Examiner*—Wei-Po Kao
(74) *Attorney, Agent, or Firm*—Sughrue Mion, PLLC

(57) ABSTRACT

A serial interface circuit includes a plurality of serial transmitters for a plurality of channels, respectively; and a plurality of serial receivers provided for said plurality of channels and connected with said plurality of serial transmitters, respectively. Each of said plurality of serial transmitters transmits a serial signal. Each of said plurality of serial receivers includes a receiver circuit configured to convert the serial signal into a data sequence; n (n is an integer more than 1) register groups configured to shift the data sequence; a data processing circuit configured to perform a data process on said data sequence based on n outputs of said n register groups and a detection result; and a header detecting circuit configured to detect a header of the data sequence when said b register groups from a first register group to a $b^{th}$ register group among said n register groups shift the data sequence, and to output the detecting result to said data processing circuit.

12 Claims, 6 Drawing Sheets

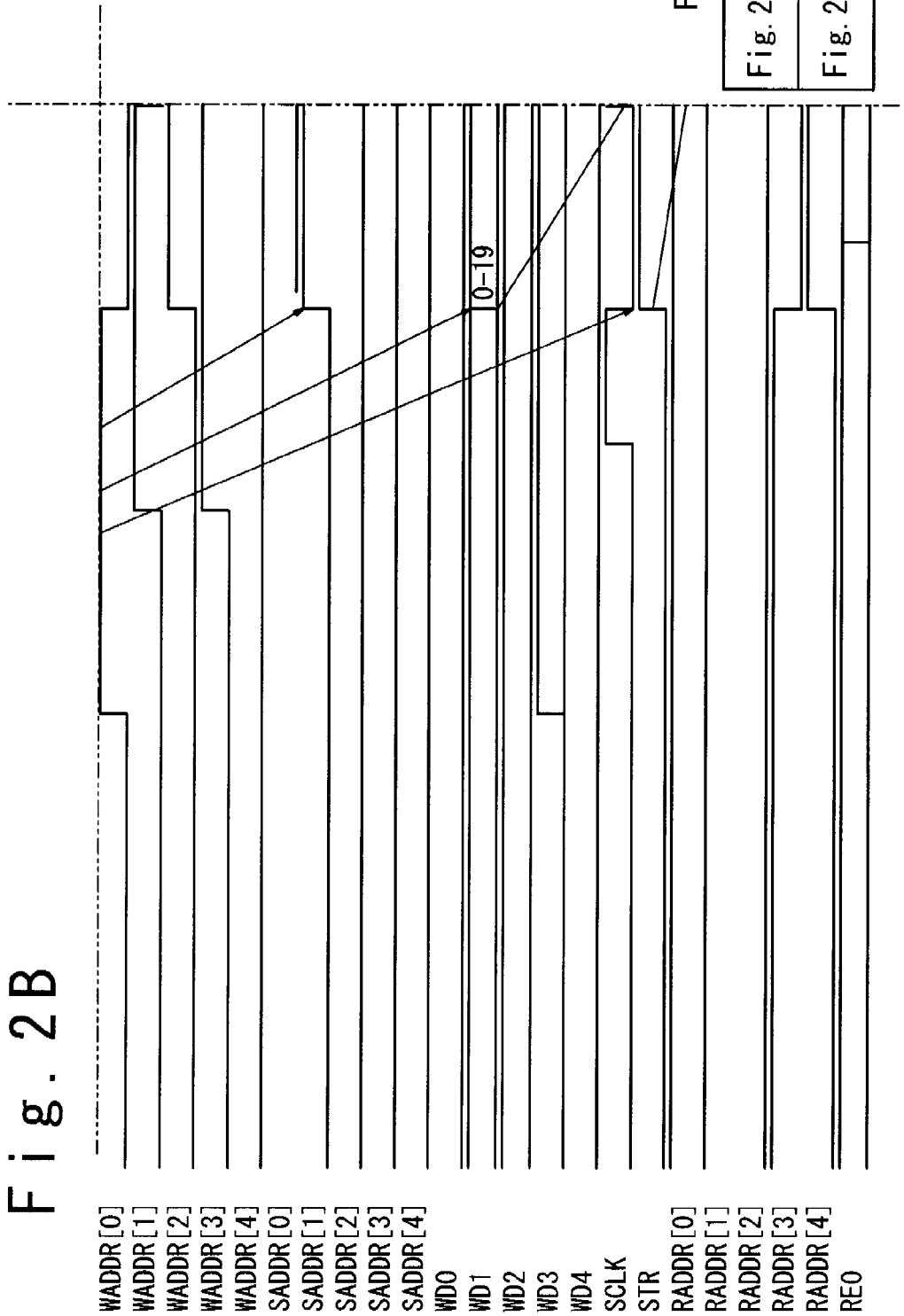

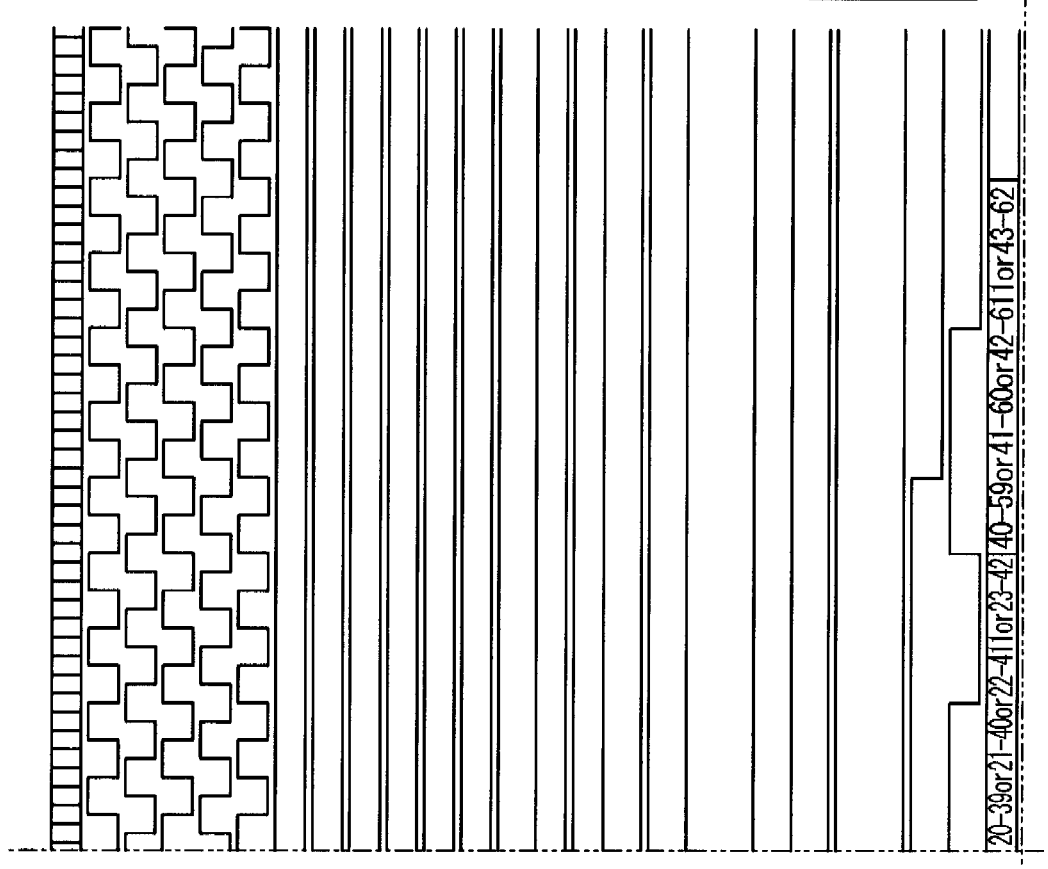

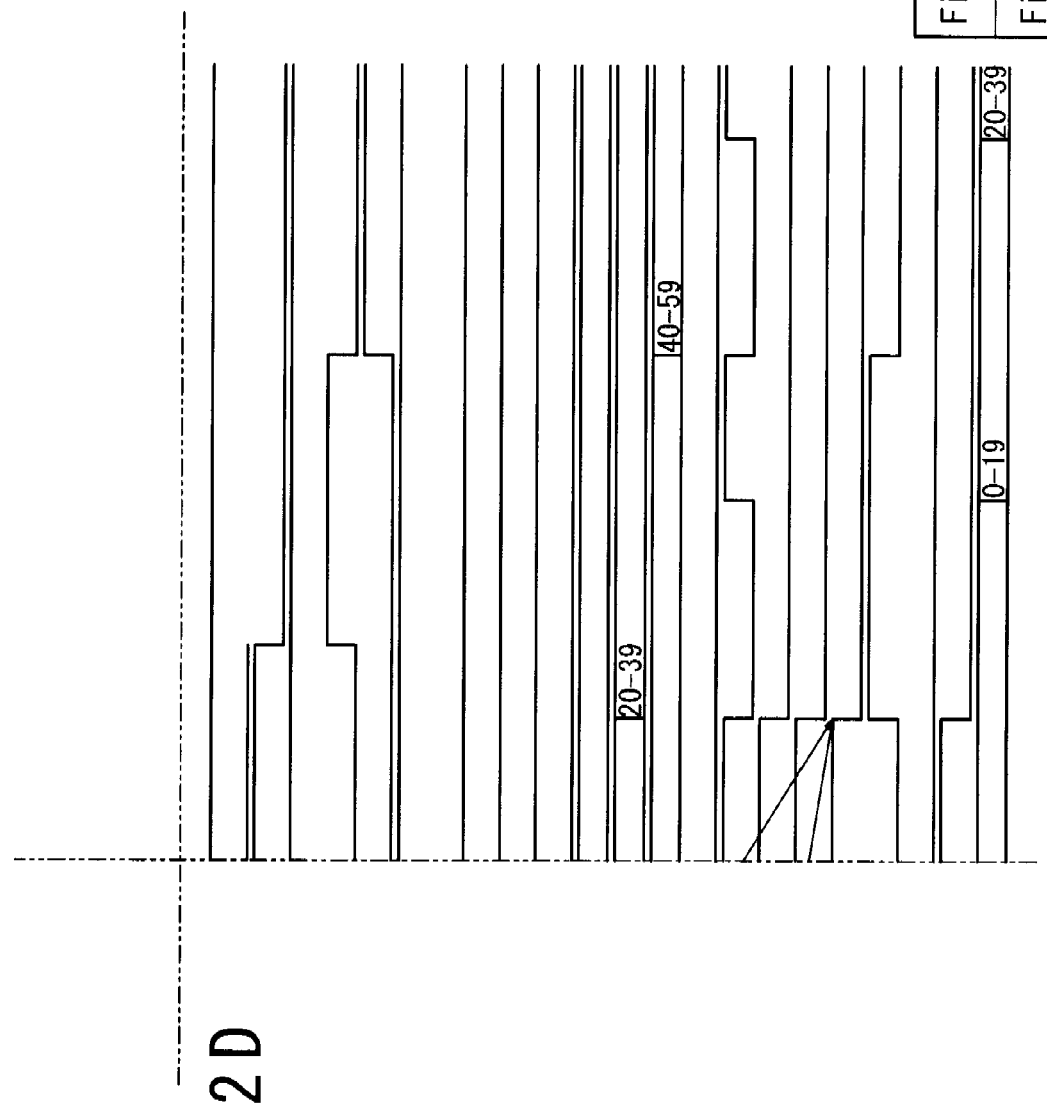

SERIAL INTERFACE CIRCUIT AND SERIAL RECEIVER

TECHNICAL FIELD

The present invention relates to a serial interface circuit that uses a plurality of channels. This US patent application is based on Japanese Patent Application No. 2007-041169. The disclosure thereof is incorporated herein by reference.

BACKGROUND ART

A serial interface circuit is known that uses a plurality of channels. For example, in Japanese Patent Application Publication (JP-P2006-302277A), a serial transmission through channels is disclosed. In this conventional example, word synchronization and de-skew (synchronization with a system clock signal) are carried out in different blocks. Inter-channel synchronization is carried out in a byte serial-parallel converter, a phase compensation FIFO or the like in a further back stage of the above block. In the standards of Infiniband and 10 Gbit Ethernet, the number of skip signals subsequent to a comma signal as a header bit sequence is increased or decreased to compensate a clock rate difference between a serial transmitter and a serial receiver.

In such a conventional example, there are the following problems. At first, the word synchronization, the de-skew, the compensation for a rate difference in clock signals, and the inter-channel synchronization are separately performed in different blocks. As a result, a header detection is performed for the word synchronization, and the detected signal is used only for the word synchronization. In order to detect a head portion of data in each of channels for the inter-channel synchronization, it is necessary that another detecting circuit different from a circuit for the header detection is provided to detect the header portion. For this reason, there is the problem that a latency becomes long.

Next, a FIFO circuit which requires many registers is used in the de-skewing circuit, a rate compensating circuit and an inter-channel aligning circuit. Thus, there is the problem that the hardware becomes large.

Moreover, in a serial transmission circuit having a plurality of channels, the circuit is designed under an assumption that, when an error is generated even in one bit, all data are re-transmitted. For this reason, there is the problem that the generation of the error involves a long latency and also a memory for storing the data is required.

In the conjunction with the above description, Japanese Patent Application Publication (JP-P2006-302277A) discloses a receiver of a serial interface. In this conventional example, the receiver of the serial interface is used in a programmable logic device. The receiver of the serial interface includes a word alignment stage that contains at least one block for providing a word aligned output, a de-skew stage that contains at least one block for providing a de-skew output, and a rate matching stage that contains at least one block for providing a rate aligned output. The receiver further includes an embedded protocol decoder stage that contains at least one block for providing a decoded output, a byte serial-parallel converter stage that contains at least one block for providing a parallel output, a byte re-arrangement stage that contains at least one block for providing a re-arranged output, and a phase compensation stage that contains at least one block for providing a phase compensated output. The receiver further includes bypass circuits around the respective stages, and a selector circuit for selecting outputs from the outputs of the stages and the outputs of the bypass circuits. Thus, any one stage among the plurality of stages can be programmably included in the receiver of the serial interface.

Japanese Patent Application Publication (JP-A-Heisei 10-97481) discloses a microcomputer. The conventional microcomputer includes a CPU, a receiving circuit for sequentially receiving serial data supplied from an external circuit, and a header detecting circuit for detecting whether or not a partial data already received by the receiving circuit has a part coincident with a predetermined header. When the partial data is detected to has the part coincident with the predetermined header, an interrupting circuit issues an interrupt to the CPU to perform a predetermined interrupting process corresponding to the header on the following partial data, each time the receiving circuit receives a plurality of partial data following the above partial data after the detection.

Japanese Patent Application Publication (JP-A-Heisei 7-6130) discloses a data transfer circuit. In the conventional data transfer circuit, a synchronous FIFO circuit has a data input, a data output and a control output, and the control output indicates that the synchronous FIFO circuit has data words for transfer. A synchronizing circuit has a control input and a control output, and the control input of the synchronizing circuit is connected to the synchronous FIFO control output. An asynchronous FIFO circuit has a data input, a control input and a data output, and the data input of the asynchronous FIFO circuit is connected to the data output of the synchronous FIFO circuit, and the control input of the asynchronous FIFO circuit is connected to the control output of the synchronizing circuit. An asynchronous data signal, which is supplied from one of asynchronous apparatuses to the data input of the synchronous FIFO circuit, is outputted to the other of the asynchronous apparatuses from the output of the asynchronous FIFO circuit after a transmission delay.

Japanese Patent Application Publication (JP-A-Heisei 2-85950) discloses an inter-bus transfer system. The inter-bus transferring system is provided with a microprocessor, a memory, a direct memory access controller, a serial controller, a plurality of I/O function blocks, and a common bus for connection between the respective units. This inter-bus transfer system is further provided with a local bus that can arbitrarily change a data transfer direction when a data is transferred between the serial controller and the plurality of I/O function blocks, a register file of a first kind to change the data transfer direction between the local bus and the serial controller; and a plurality of register files of a second kind to change the data transfer direction between the local bus and each of the plurality of I/O function blocks.

SUMMARY

In an exemplary aspect of the present invention, a serial interface circuit includes a plurality of serial transmitters for a plurality of channels, respectively; and a plurality of serial receivers provided for said plurality of channels and connected with said plurality of serial transmitters, respectively. Each of said plurality of serial transmitters transmits a serial signal. Each of said plurality of serial receivers includes a receiver circuit configured to convert the serial signal into a data sequence; n (n is an integer more than 1) register groups configured to shift the data sequence; a data processing circuit configured to perform a data process on said data sequence based on n outputs of said n register groups and a detection result; and a header detecting circuit configured to detect a header of the data sequence when said b register groups from a first register group to a bth register group among said n register groups shift the data sequence, and to output the detecting result to said data processing circuit.

In another exemplary aspect of the present invention, a serial interface circuit includes a plurality of serial transmitters for a plurality of channels, respectively; a plurality of serial receivers provided for said plurality of channels and connected with said plurality of serial transmitters, respectively; an error correction coding generator connected with inputs of the said plurality of serial transmitters and configured to correct a 1-bit error and a 1-channel error; and an error correction coding unit connected with outputs of said plurality of serial receivers and configured to correct a 1-bit error said and a 1-channel error. Each of said plurality of serial transmitters transmits a serial signal. Each of said plurality of serial receivers includes a receiver circuit configured to convert the serial signal into a data sequence; n (n is an integer more than 1) register groups configured to shift the data sequence; a data processing circuit configured to perform a data process on said data sequence based on n outputs of said n register groups and a detection result; and a header detecting circuit configured to detect a header of the data sequence when said b register groups from a first register group to a bth register group among said n register groups shift the data sequence, and to output the detecting result to said data processing circuit.

BRIEF DESCRIPTION OF THE DRAWINGS

The above and other objects, advantages and features of the present invention will be more apparent from the following description of certain exemplary embodiments taken in conjunction with the accompanying drawings, in which.

EXEMPLARY EMBODIMENTS

Hereinafter, a serial interface circuit according to exemplary embodiments of the present invention will be described in detail with reference to the attached drawings.

Figure 1:
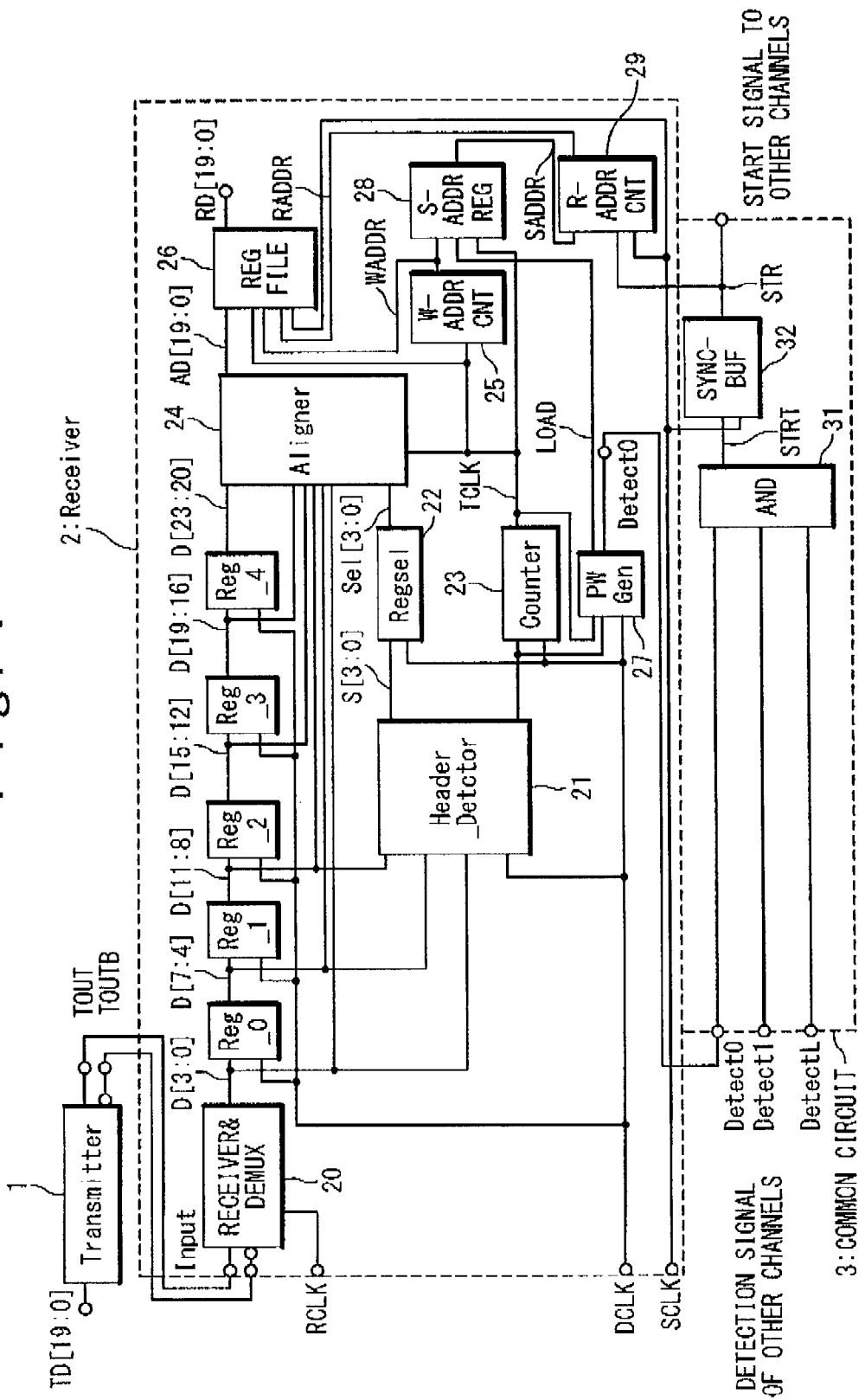
FIG. 1 is a block diagram showing a configuration of a serial interface circuit of the present invention.

FIG. 1 is a block diagram showing the configuration of the serial interface circuit according to a first exemplary embodiment of the present invention. Referring to FIG. 1, the serial interface circuit in the first exemplary embodiment contains L (L is an integer more than 1) serial transmitters 1, L serial receivers 2 and a common circuit 3. The L serial transmitters 1 and the L serial receivers 2 are provided for L channels, respectively, and the L serial transmitters 1 are connected to the L serial receivers 2, respectively. Also, the L serial receivers 2 are connected to the common circuit 3. The serial receiver 2 contains a receiver circuit (RECEIVER&DEMUX) 20, a header detecting circuit (Header_Detector) 21, n (n is an integer more than 1) register groups Reg_0, Reg_1, Reg_2 to Reg_(n−1), and a data processing section. The data processing section contains a latching circuit (Regsel) 22, a clock generating circuit (Counter) 23, an aligning circuit (Aligner) 24 and a read/write section. The read/write section contains a write address generating circuit (W-ADDRCNT) 25, a register file (REGFILE) 26, a pulse width generating circuit (PWGen) 27, a start address storing circuit (S-ADDRREG) 28 and a read address counter (R-ADDRCNT) 29.

The common circuit 3 contains an AND circuit 31 and a synchronizing circuit (SYNC-BUF) 32.

The serial transmitter 1 has outputs TOUT and TOUTB as positive and negative outputs. This serial transmitter 1 converts a c-bit (c is an integer more than 1) data TD[c−1:0] synchronous with a system clock signal SCLK on a transmission side into a serial data and then transmits the serial data from the outputs TOUT and TOUTB.

The receiver circuit 20 has a differential input Input connected to the outputs TOUT and TOUTB of the serial transmitter 1. In this receiver circuit 20, the serial data is received by the differential input Input, and is sampled at leading (and/or the trailing) edges of m (m is a positive integer) first clock signals RCLK whose timings are different. Thus, the receiver circuit 20 converts the sampled data into a data sequence D[m−1:0] of m data synchronized with a second clock signal DCLK which has a same period as that of the first clock signal RCLK or a period larger integer times than that of the first clock signal RCLK.

The n register groups Reg_0, Reg_1, Reg_2 to Reg_(n−1) are provided in this order from the first register group to the nth register group. Each of the n register groups Reg_0, Reg_1, Reg_2 to Reg_(n−1) has a clock input to receive the second clock DCLK, and m registers. The first register group Reg_0 receives the data sequence D[m−1:0] outputted from the receiver circuit 20. The second to nth register groups Reg_1, Reg_2 to Reg_(n−1) receive the outputs of the first to (n−1)th register groups Reg_0, Reg_2 to Reg_(n−2), respectively. The n register groups Reg_0, Reg_1, Reg_2 to Reg_(n−1) shift the data sequences in this order from the first register group to the nth register group in response to the second clock DCLK.

The header detecting circuit 21 contains m header detectors (not shown) and an OR circuit (not shown). The m header detectors receive the data sequences D[(b*m−1):((b−1)*m−a+1)] from the b (a is a positive satisfying a<c and b is a positive satisfying b≦n) register groups Reg_0 to Reg_(b−1) among the n register groups Reg_0, Reg_1, Reg_2 to Reg_(n−1), and the sampling is carried out in response to the second clock DCLK. Each of the m header detectors compares a header bit sequence comma indicating a bits to specify the start bits of the data sequence D[m−1:0] and a bit sequence indicating the start bits of the data sequence D[(b*m−1):((b−1)*m−a+1)], and detects the header of the data sequence D[m−1:0]. In the data represented by the data sequence D[(b*m−1):((b−1)*m−a+1)], when the bit sequence indicating the start bits of the data D[(b*m−1)], D[(b*m−2)] to D[(b−1)*m] is coincident with the header bit sequence comma, the m header detectors output detection signals S(m−1) indicating a signal level "1", S(m−2) to S(0), respectively. The a bits may be of a plurality of kinds. Also, since there are the start bits corresponding to the m bits, the m header detectors are used. However, when the header detectors are coupled, the number thereof is not limited to the m. The OR circuit performs a logical OR on the signal level "1" represented by the detection signal S[m−1:0] and generates and outputs an OR signal Reset. The OR signal Reset may be sampled on the basis of the second clock signal DCLK, and the timing may be adjusted. In this way, the header detecting circuit 21 outputs the detection signal S[m−1:0] and the OR signal Reset, as the detection result.

The data processing sections (22 to 29) perform a data process on the data sequence in accordance with the output of the nth register group Reg_(n−1) and the detection result. The data process will be described below.

The latching circuit 22 latches the detection signal S[m−1:0] outputted from the header detecting circuit 21 and holds the state until the next change of the detection signal S. Also, the latching circuit 22 outputs a selection signal Sel[(m−1):0] at the same timing as the output of the a bits (the start bits of the header bit sequence comma) to the nth register group Reg_(n−1) on the basis of the second clock signal DCLK.

The clock generating circuit 23 is reset in response to the OR signal Reset outputted from the header detecting circuit 21. Also, if the OR signal Reset output is made invalid, the clock generating circuit 23 outputs a third clock signal TCLK while a parallel data output RD[c−1:0] is repetitively counted d times (d is 1/m of the number of bits c) on the basis of the second clock signal DCLK.

The aligning circuit 24 has the (c+m−1) inputs of the data sequence D[((n+1)*m−1):n*m] that is the output of the nth register group Reg_(n−1), the data sequence D[n*m−1:(n−1)*m] that is the input of the nth register group Reg_(n−1); and the data sequences D[((n−1)*m−1):(n−2)*m] to D[((n+1−d)*m−1):((n−d)*m+1)] that are the inputs of the (n−1)th to (n−d+1)th register groups Reg_(n−2), Reg_(n−3) to Reg_(n−d). When the latching circuit 22 outputs the selection signals Sel[m−1], Sel[m−2] to Sel[0], the aligning circuit 24 defines the data sequences D[((n+1)*m−1)], D[((n+1)*m−2)] to D[(n*m)] in a order from the highest order to the lowest order, and samples the c bits as the start bits of these data sequences at the leading (or the trailing) edge of the third clock signal TCLK, and then outputs an alignment signal AD[(c−1):0]. In this way, it is possible to align the c bits whose start from the header bit sequence comma coincident with the a bits to specify start bits, in the header detecting circuit 21.

The read/write section perform the read/write process on the data sequence D[((n+1)*(m−1):n*m] in accordance with the alignment signal AD[(c−1):0]. The read/write process will be described below.

The write address generating circuit 25 counts from 0 to (WA−1) on the basis of the third clock signal TCLK and generates WA write address outputs WADDR. Here, WA is a positive integer. The register file 26 writes the alignment signal AD[(c−1):0] from the aligning circuit 24 on the basis of the third clock signal TCLK, in accordance with the write address output WADDR from the write address generating circuit 25, and reads data of the address specified by the read address RADDR and then generates a read data output RD[c−1:0]. Here, a read data output on the basis of the system clock signal SCLK may be defined as the read data output RD[c−1:0]. The pulse width generating circuit 27 sets the OR signal Reset from the header detecting circuit 21 in response to the second clock signal DCLK and generates a start detection signal Detect having a predetermined pulse width (representing a signal level "1"). Also, the pulse width generating circuit 27 outputs a load signal LOAD whose pulse width corresponds to one cycle of the third clock signal TCLK.

The start address storing circuit 28 writes and latches the write address output WADDR when the start bits of the data sequence are written into the register file 26 in accordance with the load signal LOAD outputted from the pulse width generating circuit 27. A start signal STR is supplied to the read address counter 29 from the common circuit 3. When this start signal STR is made valid, the read address counter 29 latches a start address signal SADDR outputted from the start address storing circuit 28 in response to the system clock signal SCLK. Also, when the start signal STR is made invalid, the read address counter 29 starts and repeats a counting operation from 0 to (WA−1) and generates the read address RADDR and then outputs to the register file 26. At this time, in the L channels, the read is carried out from the start bits of the data written into the register file 26. Thus, the outputs aligned between the channels are obtained.

An AND circuit 31 in the common circuit 3 receives the L start detection signals Detect1, Detect2 to DetectL outputted from the pulse width generating circuits 27 in the L serial receivers 2, respectively, and calculates the logical AND of the signal levels represented by the L start detection signals Detect1, Detect2 to DetectL. By performing the logical AND, the AND circuit 31, can check whether or not the a bits (the header bit sequence comma) are detected in the L channels, and as its result, outputs a read start signal STRT. A synchronizing circuit 32 in the common circuit 3 synchronizes the read start signal STRT outputted from the AND circuit 31, by using the leading (and/or the trailing) edge of the system clock signal SCLK, and then outputs the start signal STR whose pulse width corresponds to one cycle, to the read address counters 29 in the L serial receivers 2.

According to the serial interface circuit of the present invention, the header detecting circuit 21 operates from the timing when the data sequences D[(b*m−1):((b−1)*m−a+1)] that are the inputs of the first to bth (b is an integer satisfying b<n) register groups Reg_0 to Reg_(b−1) among the n register groups Reg_0, Reg_1, Reg_2 to Reg_(n−1) are aligned. That is, when the first to bth register groups Reg_0 to Reg_(b−1) shift the data sequences, the headers of the data sequences are detected, and the detection results {the detection signal S[m−1:0], the OR signal Reset} are outputted to the data processing section. Thus, the header can be detected at earlier timing.

Also, in accordance with the output of the header detecting circuit 21, the aligning circuit 24 in the data processing section specifies and selects the start bits, and the clock generating circuit 23 generates the clock signal TCLK used to latch the data sequence by the aligning circuit 24, and the pulse width generating circuit 27 generates the start detection signal Detect and the load signal LOAD.

Also, in accordance with the load signal LOAD outputted from the pulse width generating circuit 27, the start address storing circuit 28 writes and latches the write address output WADDR when the start bits of the data sequence is written to the register file 26.

Also, in accordance with the start detection signal Detect outputted from the pulse width generating circuit 27, the AND circuit 31 and the synchronizing circuit 32 detect the timing when all of the L channels are aligned, and synchronize their signals in response to the system clock signal SCLK and then generate the start signal STR as the timing when the start bits are read at the same time.

Also, the start signal STR outputted from the synchronizing circuit 32 is distributed to the L channels. The read address counter 29 latches the start address signal SADDR outputted from the start address storing circuit 28 in response to the system clock signal SCLK, when the start signal STR is made valid, and repeats the counting operation from the read value to generate the read address RADDR when the start signal STR is made invalid.

The serial interface circuit of the present invention can detect the header at the earlier timing with respect to the timings in those circuits and consequently minimize the latency.

Also, in the serial interface circuit of the present invention, the time represented by the pulse width of the start detection signal Detect is set to be longer than a summation of the time corresponding to a skew between the channels from the L serial transmitters 1 to the output of the AND circuit 31 in the common circuit 3 in the respective serial receivers 2 and a time corresponding to one period of the system clock signal SCLK. Consequently, when the time corresponding to the skew elapses, if the erroneous detection of the header bit sequence comma is generated, the erroneous detection is ignored. This is related to only the transmission error in one channel, and can eliminate influence on the other channels. Also, when the header bit sequence comma is not detected even in one channel, the AND circuit 31 holds an invalid state. Thus, the transmission state immediately before the generation of the transmission error is held, and the transmission error can be reduced.

Also, in the serial interface circuit of the present invention, when a data is written into the register file 26, the synchronizing circuit 32 synchronizes the read start signal STRT from the AND circuit 31 with the system clock signal SCLK, and outputs the start signal STR having a pulse width corresponding to one cycle of the system clock signal SCLK. At this time, when the same address is read, the read address RADDR is issued is after a time corresponding to a summation of one period of the system clock signal and a delay to the register file 26 and a circuit for selecting the read data. Also, the addresses 0 to (WA−1) are set in such a way that a data is not written in a same address before a time corresponding to a summation of one period of the system clock signal and a delay to the register file 26 and a circuit for selecting the read data. Thus, the latency can be made short.

Figure 2A:
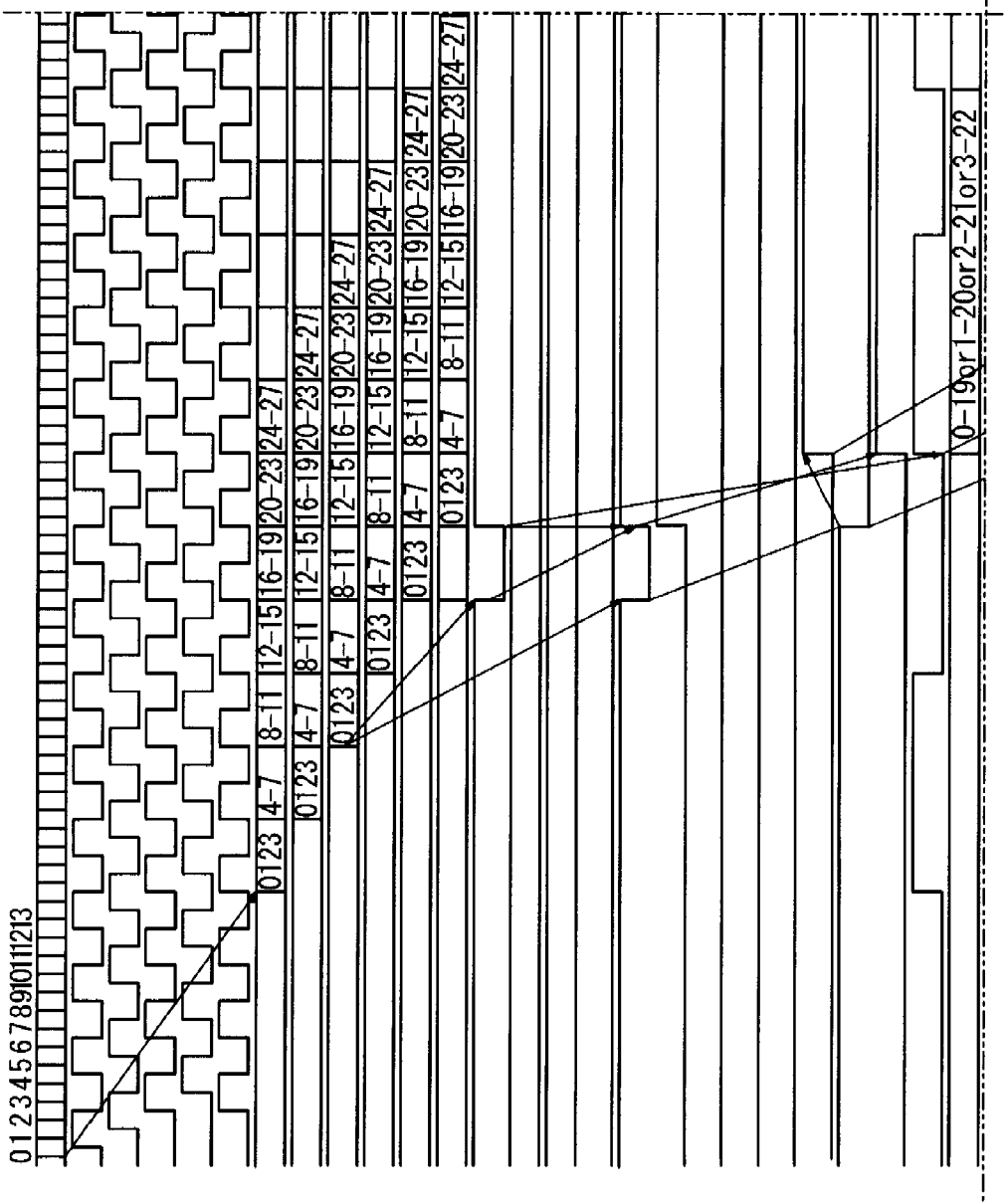
FIG. 2 is a timing chart showing operations of the serial interface circuit of the present invention.

Next, FIG. 2 is timing charts showing the operation of the serial interface circuit of the present invention. In this exemplary embodiment, it is assumed that m=4, n=5, a=8, b=3, c=20, d=5 and WA=5.

A serial data is given to the receiver circuit 20. At this time, in the receiver circuit 20, the serial data is received from the differential input Input, and the serial data is sampled at the leading edges (and/or the trailing edges) of 4 first clock signals RCLK[3:0], and converted into a data sequence D[3:0] having 4 data synchronous with the second clock signal DCLK having a same period as that of the first clock signal RCLK[3:0] or a period longer than integral times than the period of the first clock signal RCLK[3:0].

Among the 5 register groups Reg_0, Reg_1, Reg_2 to Reg_4, the first register group Reg_0 receives the data sequence D[3:0] outputted from the receiver circuit 20, and generates a data sequence D[7:4] shifted by using 4 internal registers in response to a second clock signal DCLK. The second register group Reg_1 receives the data sequence D[7:4] outputted from the first register group Reg_0, and generates a data sequence D[11:8] shifted by using 4 internal registers in response to the second clock signal DCLK. The third register group Reg_2 receives the data sequence D[11:8] outputted from the second register group Reg_1, and generates a data sequence D[15:12] shifted by using 4 internal registers in response to the second clock signal DCLK. The fourth register group Reg_3 receives the data sequence D[15:12] outputted from the third register group Reg_2, and generates a data sequence D[19:16] shifted by using 4 internal registers in response to the second clock signal DCLK. The fifth register group Reg_4 receives the data sequence D[19:16] outputted from the fourth register group Reg_3, and generates a data sequence D[23:20] shifted by using 4 internal registers in response to the second clock signal DCLK. In this way, the 5 register groups Reg_0, Reg_1, Reg_2 to Reg_4 generate the data sequence D[23:0] in this order from the first to fifth register groups in response to the second clock signal DCLK.

The 4 header detectors in the header detecting circuit 21 receives the data sequence D[11:1] from the 3 register groups Reg_0 to Reg_2 among the 5 register groups Reg_0, Reg_1, Reg_2 to Reg_4, and the sampling is carried out in response to the second clock signal DCLK. Those 4 header detectors compares the header bit sequence comma including 8 bits to specify the start bits of the data sequence D[3:0] and a bit sequence indicating the start bits of the data sequence D[11:1] and detects the header of the data sequence D[m−1:0]. When the bit sequence indicating the start bits of the data D[11], D[10], D[9] and D[8] in the data sequence D[11:1] is equal to the header bit sequence comma, namely, equal to the above 8 bits, the 4 header detectors output the detection signals S3, S2, S1 and S0 of the signal level "1", respectively. Typically, the header bit sequence comma is compared in unit of 7 bits. Also, although this has 2 kinds of 0011111 and 1100000, the 4 header detectors are used because of the existence of the start bits corresponding to the 4 bits. When the header detectors are coupled, the number is not limited to 4 (=m). Also, signals except 0011111 and 1100000 may be defined as the header bit sequence comma.

An OR circuit in the header detecting circuit 21 calculates a logic OR of signal levels of the detection signal S[3:0] and generates and outputs the OR signal Reset. Although the start bits may be any one of 0, 1, 2 and 3, 0 is assumed on the drawing, and S[3] is defined as the selection signal. Simultaneously, the OR signal Reset is generated. Here, the detection signal S[3] and the OR signal Reset are outputted two clocks after the data sequence D[11:8] is supplied to the input of the third register group Reg_2. However, the output is not limited to the 2 clocks.

The latching circuit 22 latches the detection signal S[3:0] outputted from the header detecting circuit 21, and keeps its state until the next change of the detection signal S. Also, the latching circuit 22 outputs the selection signal Sel[3:0] at the same timing as the 8 bits (the start bits of the header bit sequence comma) are outputted to the fifth register group Reg_4 in response to the second clock signal DCLK. Simultaneously, the clock generating circuit 23 resets the count in response to the OR signal Reset outputted from the header detecting circuit 21. If the OR signal Reset is made invalid, the clock generating circuit 23 outputs the third clock signal TCLK while the clock generating circuit 23 repeatedly performs a counting operation 5 times in response to the second clock signal DCLK, in which 5 is ¼ of the number of bits 20 of the parallel data output RD[19:0]. The leading edge of the third clock signal TCLK is outputted at a time of the leading edge of a clock next to the clock at which the signal 0 as the start bit is outputted, for output from the fifth register group Reg_4.

The aligning circuit 24 receives 23 inputs of the data sequence D[23:20] outputted from the fifth register group Reg_4, the data sequence D[19:16] that is also received by the fifth Reg_4, and the data D[15:12] to D[3:1] that are also received by the fourth to first register groups Reg_3, Reg_2 to Reg_0. Simultaneously, when the latching circuit 22 outputs the selection signal Sel[3], the aligning circuit 24 samples the 20-bit data sequence D[23:4] in response to the third clock signal TCLK by using the highest-order data D[23] of the fifth register group Reg_4 as the start bits and then outputs an alignment signal AD[19:0]. When the selection signal Sel[2] is outputted, the aligning circuit 24 samples the second highest order output D[22:3], and when the Sel[1] is outputted, the aligning circuit 24 samples the third highest order output D[21:2], and when the Sel[0] is outputted, the aligning circuit 24 samples the lowest order output D[20:1], and then outputs as the alignment signal AD[19:0]. In this way, it is possible to align the 20 bits starting from the header bit sequence comma coincident with the 8 bits to specify the start bits, in the header detecting circuit 21.

The write address generating circuit 25 repeats the counting of 0 to 4 in response to the third clock signal TCLK and generates the 4 write address outputs WADDR. In this exemplary embodiment, the trailing edge of the third clock signal TCLK is defined as a valid edge. However, the leading edge may be defined as the valid edge.

The register file 26 writes the alignment signal AD[19:0] of the aligning circuit 24 based on an address of the write address output WADDR[4:0] from the write address generating circuit 25 in response to the trailing edge of the third clock signal TCLK. However, this may be the leading edge. The written data is read as a data from an address specified in accordance with the read address RADDR[4:0], and is latched by an output register in response to the leading edge of the system clock signal SCLK and outputted as a read data output RD[19:0]. However, when the output register does not exist in the register file, the data selected in accordance with the read address RADDR[4:0] may be outputted as the read data output RD[19:0].

The pulse width generating circuit 27 sets the OR signal Reset from the header detecting circuit 21 in response to the second clock signal DCLK and generates the start detection signal Detect having a predetermined pulse width (of the signal level "1"). Also, the pulse width generating circuit 27 outputs the load signal LOAD having a pulse width corresponding to one period of the third clock signal TCLK.

The start address storing circuit 28 writes and latches the write address output WADDR when the start bits of the data is written into the register file 26, in response to the load signal LOAD outputted from the pulse width generating circuit 27.

When the start signals STR simultaneously outputted from the common circuit 3 to the L channels is made valid, the read address counter 29 latches the start address signal SADDR [3:0] outputted from the start address storing circuit 28 in response to the trailing edge of the system clock signal SCLK, and outputs it as the read address RADDR. Also, when the start signals STR is made invalid, the read address counter 29 starts the counting operation from the latched value and repeatedly performs the counting operation from 0 to 4, and generates a read address RADDR[4:0] and then outputs it to the register file 26. At this time, in the L channels, the read is carried out from the start bits of the data written to the register file 26. Thus, the outputs aligned between the channels can be obtained.

The AND circuit 31 in the common circuit 3 receives the L start detection signals Detect1, Detect2 to DetectL, which are outputted from the pulse width generating circuits 27 in the L serial transmitters 1, respectively. The AND circuit 31 calculates a logical AND of the signal levels of the L start detection signals. Through the calculation of the logical AND, the AND circuit 31 can check whether or not the 8 bits (the header bit sequence comma) are detected in the L channels and outputs the read start signal STRT as its result. If they are not detected in even one channel, the logical AND cannot be attained. Thus, the read start signal STRT is not outputted. If there is the unused channel, the start detection signals is hanged up or down as if it is always detected, so that the unused channel can be ignored.

The synchronizing circuit 32 in the common circuit 3 synchronizes the read start signal STRT outputted from the AND circuit 31, by using the two-stage flip-flop for latching in the order of the trailing and leading edges of the system clock signal SCLK, and outputs the start signal STR, in which the front edge is differentiated to the pulse width corresponding to one period, to the read address counters 29 in the L serial receivers 2.

As mentioned above, in the serial interface circuit of the present invention, the pulse width of the start detection signal Detect is set to be longer than a summation of a time corresponding to the skew from the outputs of the L serial transmitters 1 to the output of the AND circuit 31 in the common circuit 3 in the serial receivers 2 between the channels and a time corresponding to one period of the system clock signal SCLK. Consequently, when the time corresponding to the skew elapses, if the erroneous detection of the header bit sequence comma is caused, the erroneous detection is ignored. This is related to only the transmission error in one channel, to avoid influence to the other channels. Also, in the AND circuit 31, when the header bit sequence comma is not detected even in one channel, the transmission state immediately before the generation of the transmission error is held and the invalid state in which the read start signal STRT is not outputted is held. In this way, in the serial interface circuit of the present invention, the transmission error can be reduced.

Also, in the serial interface circuit of the present invention, when the output (the read start signal STRT) of the AND circuit 31 is synchronized with the system clock signal, there is a case that the timing of the synchronized output is shifted by one period in a front direction or back direction. An invalid data corresponding to one data or more is added immediately before the header bit sequence comma. In this case, the 8-bit data to specify the start bits is made identical to the above a-bit data. Consequently, the serial interface circuit of the present invention can carry out the transmission without any change of the actual data, by omitting the invalid data corresponding to one data or reading the header bit sequence comma two times.

Also, in the serial interface circuit of the present invention, when in the write into the register file 26, the synchronizing circuit 32 synchronizes the timing at which the same address as in the write is read with the system clock signal SCLK, the read address RADDR is issued at a timing later than the timing obtained by adding a margin for one period depending on a phase between two signals and a delay to the register file 26 and a circuit for selecting the read data. It is possible to make the latency short by setting the addresses 0 to 4 such that a data is not written in a same address earlier than the above timing for a summation of a delay from the read address counter 29 to an output register and a margin for one period.

Figure 3:
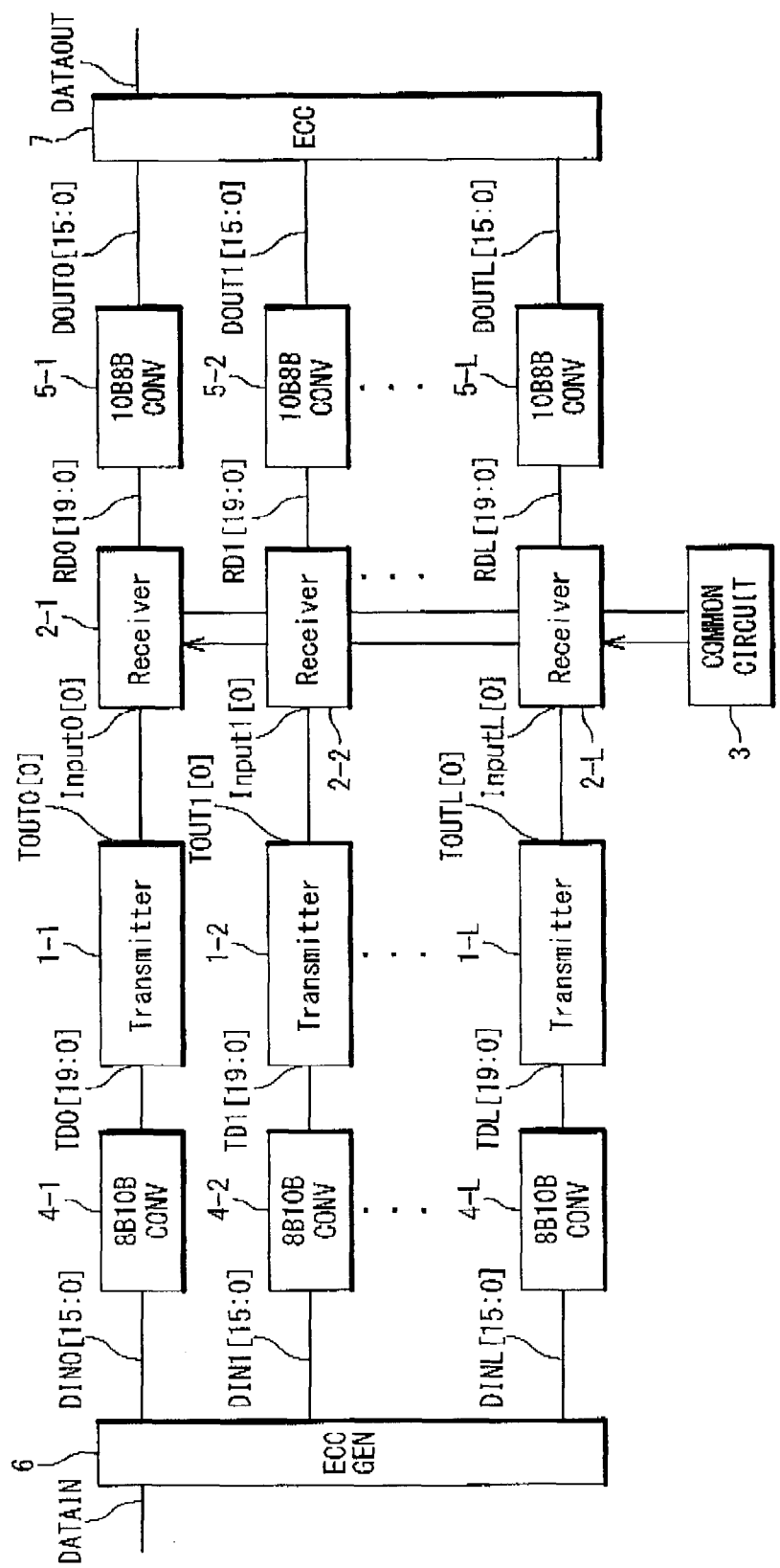
FIG. 3 shows an application example of FIG. 1.

FIG. 3 shows an application example of the serial interface circuit according to exemplary embodiments of the present invention. The serial interface circuit of the present invention contains serial transmitters 1-1 to 1-L, serial receivers 2-1 to 2-L, the common circuit 3, an error correction coding generator (ECCGEN) 6, and an error correction coding unit (ECC) 7. Since the error correction coding generator and the error correction coding unit are well known to one skilled in the art, their detailed explanations are omitted.

The serial transmitters 1-1 to 1-L and the serial receivers 2-1 to 2-L correspond to the L channels. The output of the error correction coding generator 6 is connected to the inputs of the serial transmitters 1-1 to 1-L. The outputs of the serial transmitters 1-1 to 1-L are connected to the inputs of the serial receivers 2-1 to 2-L, respectively. The outputs of the serial receivers 2-1 to 2-L are connected to the input of the error correction coding unit 7. The error correction coding generator 6 corrects 1-bit error and 1-channel error. The error correction coding unit 7 corrects 1-bit error and 1-channel error. Through such a configuration, the data can be reproduced without any re-transmission, even if an error is generated in one channel or even if the header bit sequence comma cannot be detected.

Also, the serial interface circuit of the present invention further contains 8B10B converters (8B10BCONV) 4-1 to 4-L and 10B8B converters (10B8BCONV) 5-1 to 5-L. The 8B10B converter and the 10B8B converter are well known to one skilled in the art. Thus, their detailed explanations are omitted. The 8B10B converters 4-1 to 4-L and the 10B8B converters 5-1 to 5-L correspond to the L channels. The 8B10B converters 4-1 to 4-L are connected between the error correction coding generator 6 and the serial transmitters 1-1 to 1-L, respectively. The 10B8B converters 5-1 to 5-L are connected between the serial receivers 2-1 to 2-L and the error correction coding unit 7, respectively. The 8B10B converters 4-1 to 4-L discriminate the actual data and the header bit sequence comma. Such configuration allows the header bit sequence comma to be inserted at any time, in order to make it possible to discriminate the actual data and the header bit sequence comma.

Also, in the serial interface circuit according to the exemplary embodiments of the present invention, when a data is written to the register file 26, a read address RADDR is issued for a same address as in the write at a timing later than a summation of a margin for one period, a delay to the register file 26 and a circuit for selecting the read data, and a phase difference which is generated during a time interval in which the header bit sequence comma is generated due to a difference between serial transmitter and the serial receiver in clock rate. Also, the difference between the serial transmitter and the serial receiver in clock rate can be compensated by setting the addresses 0 to (WA−1) such that a data is not written in the same address at a timing earlier than the above timing corresponding to the summation of the margin for one period, the delay to the register file 26 and a circuit for selecting the read data, and the phase difference which is generated during a time interval in which the header bit sequence comma is generated due to a difference between serial transmitter and the serial receiver in clock rate. In this way, the register file 26 attains the synchronization with the system clock signal, alignment between channels and the compensation of the clock rate difference between the transmitter and the receiver, in addition to the FIFO function. Therefore, the hardware can be reduced.

According to the present invention, the header detecting circuit 21 operates from the timing when the data sequences D[11:1] that are the inputs of the first to third register groups Reg_0 to Reg_2 are aligned with each other. That is, when the first to bth register groups Reg_0 to Reg_(b−1) shift the data sequences, the headers of the data sequences are detected, and the detection results are outputted to the data processing sections as the detection signal S[m−1:0] and the OR signal Reset. Thus, the header can be detected at the earlier timing.

Also, in accordance with the output of the header detecting circuit 21, the aligning circuit 24 in the data processing sections specifies and selects the start bits, and the clock generating circuit 23 generates the clock signal TCLK, in response to which the data is latched by the aligning circuit 24, and the pulse width generating circuit 27 generates the start detection signal Detect and the load signal LOAD. Also, in accordance with the load signal LOAD outputted from the pulse width generating circuit 27, the start address storing circuit 28 writes and latches the write address output WADDR when the start bits of the data are written to the register file 26. Also, in accordance with the start detection signal Detect outputted from the pulse width generating circuit 27, the AND circuit 31 and the synchronizing circuit 32 detect the timing when data on all of the L channels are aligned with each other, and synchronize the signal with the system clock signal SCLK and then generate the start signal STR as the timing when the start bits are read at the same time.

Also, the start signal STR outputted from the synchronizing circuit 32 is distributed to the L channels. The read address counter 29 latches the start address signal SADDR outputted from the start address storing circuit 28 in response to the system clock signal SCLK, when the start signal STR is made valid, and the read address counter 29 repeats the counting operation from the read value and generates the read address RADDR when the start signal STR is made invalid. The serial interface circuit of the present invention can detect the header at the quick timing in generating the timings used in those circuits and consequently minimize the latency.

In addition, the inputs of the serial transmitters 1 (the serial transmitters 1-1 to 1-L) are connected to the output of the error correction coding generator 6, the outputs of the serial receivers 2 (the serial receivers 2-1 to 2-L) are connected to the input of the error correction coding unit 7, and the error correction coding (ECC) is applied by the error correction coding generator 6 and the error correction coding unit 7. Consequently, when the data in which 1-bit error and 1-channel error can be corrected is transmitted, if the erroneous operation does not allow the header bit sequence comma to be detected in the L channels within several periods, the alignment between the channels is not executed, and the alignment state immediately before is continued to be kept, which can protect the plurality of channels from being erroneously operated.

According to the serial interface circuit of the present invention, the header can be detected at an earlier timing.

Also, in the serial interface circuit of the present invention, the values from 0 to (WA−1) are counted such that the data is not written to the same address, which can make the latency short.

In addition, when the data in which 1-bit error and 1-channel error can be corrected is transmitted, if header bit sequences (comma) can not be detected in a plurality of channels within several cycles due to an erroneous operation, the alignment between the channels is not executed, and the alignment state immediately before is continued to be kept, which can protect the plurality of channels from being erroneously operated.

While the present invention has been particularly shown and described with reference to the exemplary embodiments thereof, the present invention is not limited to these exemplary embodiments. It will be understood by those of ordinary skill in the art that various changes in form and details may be made therein without departing from the spirit and scope of the present invention as defined by the claims.

What is claimed is:

1. A serial interface circuit comprising:
  a plurality of serial transmitters for a plurality of channels, respectively; and
  a plurality of serial receivers provided for said plurality of channels and connected with said plurality of serial transmitters, respectively,
  wherein each of said plurality of serial transmitters transmits a serial signal, and
  each of said plurality of serial receivers comprises:
  a receiver circuit configured to convert the serial signal into a data sequence;
  n register groups configured to shift the data sequence, wherein n is an integer more than 1;
  a data processing circuit configured to perform a data process on said data sequence based on n outputs of said n register groups and a detection result; and
  a header detecting circuit configured to detect a header of the data sequence when b register groups from a first register group to a bth register group among said n register groups shift the data sequence, and to output the detecting result to said data processing circuit, wherein said serial transmitter converts c-bit (c is an integer more than 1) data TD[c−1:0] synchronous with a system clock signal into a serial signal and transmits the serial signal, and said receiver circuit converts the serial signal into the data sequence D[m−1:0] of m (m is a positive integer) data, said header detecting circuit receives the data sequence and the shifted data sequences, D[(b*m−1):((b−1)*m−a+1)] (a is an integer satisfying a<c) to be supplied to said b register groups, compares a header bit sequence indicating a-bit data which specifies a start bit of the data sequence D[m−1:0] and a bit sequence indicating a start bit of the data sequence D[(b*m−1):((b−1)*m−a+1)], and outputs the detecting result to said data processing circuit when the bit sequence indicating the start bits of the data D[(b*m−1)], D[(b*m−2)], . . . D[(b−1)*m] of the data sequence D[(b*m−1):((b−1)*m−a+1)] is equal to the header bit sequence.

2. The serial interface circuit according to claim 1, wherein said receiver circuit samples the serial signal in response to m first clock signals RCLK which are different in timing from each other, to convert the serial signal into the data sequence D[m−1:0] of the m data synchronous with a second clock signal which has a same period as that of said first clock signal or a period integral times larger than that of said first clock signal, said n register group shift the data sequence one after another in response to said second clock signal, and said header detecting circuit samples the data sequences D[(b*m−1):((b−1)*m−a+1)] in response to said second clock signal.

3. The serial interface circuit according to claim 2, wherein said header detecting circuit outputs an detection signal S[m−1:0] when the bit sequence indicating the start bits of the data D[(b*m−1)], D[(b*m−2)], . . . D[(b−1)*m] of the data sequence D[(b*m−1):((b−1)*m−a+1)] is equal to the header bit sequence, a logical OR calculation is carried out on the detection signal and a logical OR calculation signal is outputted as the detecting result, said data processing circuit comprises:

a latching circuit configured to latch the detection signal S[m−1:0] and holds the detection signal S[m−1:0] until the detection signal is changed next, and outputs a selection signal Sel[(m−1):0] at a same timing as the a-bit data is outputted;

a clock generating circuit configured to be reset in response to the logical OR calculation signal, and to output a third clock signal for a period during which performing a counting operation d times, when said logical OR calculation signal is invalid, wherein d is 1/m of the number of bits c of parallel data output RD[c−1:0];

an aligning circuit configured to receive the data sequence D[((n+1)*m−1):n*m] as an output of said $n^{th}$ register group, the data sequence D[n*m−1:(n−1)*m] as an input of said $n^{th}$ register group, and (c+m−1) data sequences D[((n−1)*m−1):(n−2)*m], D[((n+1−d)*m−1):((n−d)*m+1)] as inputs of said $(n-d+1)^{th}$ to $(n−1)^{th}$ register groups, and samples the highest data D[((n+1)*m−1)], . . . , the lowest data D[(n*m)] of the data sequence D[((n+1)*m−1):n*m] for c bits as the start bits in response to the third clock signal when said selection signals Sel[m−1], Sel[m−2], . . . Sel[0] are outputted from said latching circuit to output an alignment signal AD[(c−0:0];

a read/write processing section configured to carry out a read/write process of the data sequence D[((n+1)*m−1): n*m] based on said alignment signal AD[(c−1):0].

4. The serial interface circuit according to claim 3, wherein said read/write processing section comprises:

a write address generating circuit configured to repeatedly count the third clock signal from 0 to (WA−1) (WA is a positive integer) and to generate a write address output;

a register file in which said alignment signal AD[(c−1):0] from said aligning circuit is written based on said write address output from said write address generating circuit in response to the third clock signal, and is read out from a read address to produce a read data output RD[c−1:0];

a pulse width producing circuit configured to set said logical OR calculation signal from said header detecting circuit in response to the second clock signal to produce a start detection signal having a predetermined pulse width, and to generate a load signal having a pulse width for one period of the third clock signal;

a start address storage circuit in which said write address output is written in response to the load signal when the start bits are written in said register file; and a read address counter supplied with a start signal and configured to receive a start address signal from said start address storage circuit in response to the system clock signal when the start signal is valid, and to start a counting operation from 0 to (WA−1) to produce the read address when the start signal is invalid, and to output the read address to said register file.

5. The serial interface circuit according to claim 4, further comprising:

a common circuit connected with said plurality of serial receivers, wherein said common circuit comprises:

an AND circuit configured to receive a plurality of said start detection signals outputted from said pulse width producing circuit of said plurality of serial receivers, and to calculate a logical product of said plurality of start detection signals to output a read start signal; and a synchronizing circuit configured to synchronize said read start signal outputted from said AND circuit with the system clock signal, and to output said start signal having a pulse width for one period width to said reed address counters of said plurality of serial receivers.

6. The serial interface circuit according to claim 5, wherein a time of the pulse width of said start detection signal is longer than a summation of an inter-channel skew from outputs of said plurality of serial transmitters to an output of said AND circuit of said common circuit to said plurality of channels via said plurality of serial receivers and one period of said system clock signal.

7. The A serial interface circuit comprising:

a plurality of serial transmitters for a plurality of channels, respectively;

a plurality of serial receivers provided for said plurality of channels and connected with said plurality of serial transmitters, respectively;

an error correction coding generator connected with inputs of the said plurality of serial transmitters and configured to correct a 1-bit error and a 1-channel error; and an error correction coding unit connected with outputs of said plurality of serial receivers and configured to correct a 1-bit error said and a 1-channel error, wherein each of said plurality of serial transmitters transmits a serial signal, and each of said plurality of serial receivers comprises:

a receiver circuit configured to convert the serial signal into a data sequence;

n register groups configured to shift the data sequence, wherein n is an integer more than 1;

a data processing circuit configured to perform a data process on said data sequence based on n outputs of said n register groups and a detection result; and a header detecting circuit configured to detect a header of the data sequence when b register groups from a first register group to a bth register group among said n register groups shift the data sequence and to out ut the detecting result to said data processing circuit wherein said serial transmitter converts c-bit (c is an integer more than 1) data TD[c−1:0] synchronous with a system clock signal into a serial signal and transmits the serial signal, and said receiver circuit converts the serial signal into the data sequence D[m−1:0] of m (m is a positive integer) data, said header detecting circuit receives the data sequence and the shifted data sequences, D[(b*m−1):((b−1)*m−a+1)] (a is an integer satisfying a<c) to be supplied to said b register groups, compares a header bit sequence indicating a-bit data which specifies a start bit of the data sequence D[m−1:0] and a bit sequence indicating a start bit of the data sequence D[(b*m−1):((b−1)*m−a+1)], and outputs the detecting result to said data processing circuit when the bit sequence indicating the start bits of the data D[(b*m−1)], D[(b*m−2)], . . . D[(b−1)*m] of the data sequence D[(b*m−1):((b−1)*m−a+1)] is equal to the header bit sequence.

8. The serial interface circuit according to claim 7, wherein said receiver circuit samples the serial signal in response to m first clock signals RCLK which are different in timing from each other, to convert the serial signal into the data sequence D[m−1:0] of the m data synchronous with a second clock signal which has a same period as that of said first clock signal or a period integral times larger than that of said first clock signal, said n register group shift the data sequence one after another in response to said second clock signal, and said header detecting circuit samples the data sequences D[(b*m−1):((b−1)*m−a+1)] in response to said second clock signal.

9. The serial interface circuit according to claim 8, wherein said header detecting circuit outputs an detection signal S[m−1:0] when the bit sequence indicating the start bits of the data D[(b*m−1)], D[(b*m−2)], . . . D[(b−1)*m] of the data sequence D[(b*m−1):((b−1)*m−a+1)] is equal to the header bit sequence, a logical OR calculation is carried out on the detection signal and a logical OR calculation signal is outputted as the detecting result, said data processing circuit comprises:

a latching circuit configured to latch the detection signal S[m−1:0] and holds the detection signal S[m−1:0] until the detection signal is changed next, and outputs a selection signal Sel[(m−1):0] at a same timing as the a-bit data is outputted;

a clock generating circuit configured to be reset in response to the logical OR calculation signal, and to output a third clock signal for a period during which performing a counting operation d times, when said logical OR calculation signal is invalid, wherein d is 1/m of the number of bits c of parallel data output RD[c−1:0];

an aligning circuit configured to receive the data sequence D[((n+1)*m−1):n*m] as an output of said $n^{th}$ register group, the data sequence D[n*m−1:(n−1)*m] as an input of said $n^{th}$ register group, and (c+m−1) data sequences D[((n−1)*m−1):(n−2)*m], D[((n+1−d)*m−1):((n−d)*m+1)] as inputs of said $(n-d+1)^{th}$ to $(n-1)^{th}$ register groups, and samples the highest data D[((n+1)*m−1)], . . . , the lowest data D[(n*m)] of the data sequence D[((n+1)*m−1):n*m] for c bits as the start bits in response to the third clock signal when said selection signals Sel[m−1], Sel[m−2], . . . Sel[0] are outputted from said latching circuit to output an alignment signal AD[(c−1):0];

a read/write processing section configured to carry out a read/write process of the data sequence D[((n+1)*m−1):n*m] based on said alignment signal AD[(c−1):0].

10. The serial interface circuit according to claim 9, wherein said read/write processing section comprises:

a write address generating circuit configured to repeatedly count the third clock signal from 0 to (WA−1) (WA is a positive integer) and to generate a write address output;

a register file in which said alignment signal AD[(c−1):0] from said aligning circuit is written based on said write address output from said write address generating circuit in response to the third clock signal, and is read out from a read address to produce a read data output RD[c−1:0];

a pulse width producing circuit configured to set said logical OR calculation signal from said header detecting circuit in response to the second clock signal to produce a start detection signal having a predetermined pulse width, and to generate a load signal having a pulse width for one period of the third clock signal;

a start address storage circuit in which said write address output is written in response to the load signal when the start bits are written in said register file; and a read address counter supplied with a start signal and configured to receive a start address signal from said start address storage circuit in response to the system clock signal when the start signal is valid, and to start a counting operation from 0 to (WA−1) to produce the read address when the start signal is invalid, and to output the read address to said register file.

11. The serial interface circuit according to claim 10, further comprising:

a common circuit connected with said plurality of serial receivers, wherein said common circuit comprises:

an AND circuit configured to receive a plurality of said start detection signals outputted from said pulse width producing circuit of said plurality of serial receivers, and to calculate a logical product of said plurality of start detection signals to output a read start signal; and a synchronizing circuit configured to synchronize said read start signal outputted from said AND circuit with the system clock signal, and to output said start signal having a pulse width for one period width to said reed address counters of said plurality of serial receivers.

12. The serial interface circuit according to claim 11, wherein a time of the pulse width of said start detection signal is longer than a summation of an inter-channel skew from outputs of said plurality of serial transmitters to an output of said AND circuit of said common circuit to said plurality of channels via said plurality of serial receivers and one period of said system clock signal.

* * * * *

UNITED STATES PATENT AND TRADEMARK OFFICE
CERTIFICATE OF CORRECTION

PATENT NO. : 7,881,290 B2  
APPLICATION NO. : 12/034383  
DATED : February 1, 2011  
INVENTOR(S) : Toshio Tanahashi Page 1 of 1

It is certified that error appears in the above-identified patent and that said Letters Patent is hereby corrected as shown below:

Column 13, Line 64: In Claim 3, delete "AD[(c-0:0];" and insert -- AD[(c-1):0]; --

Column 15, Line 7: In Claim 7, delete "out ut" and insert -- output --

Signed and Sealed this
Sixteenth Day of October, 2012

David J. Kappos
*Director of the United States Patent and Trademark Office*